US008310728B2

(12) United States Patent
Koyatsu et al.

(10) Patent No.: US 8,310,728 B2
(45) Date of Patent: Nov. 13, 2012

(54) IMAGE FORMING APPARATUS AND COMPUTER READABLE MEDIUM FOR CONTROLLING IMAGE FORM

(75) Inventors: Jun Koyatsu, Saitama (JP); Kaoru Yamauchi, Saitama (JP); Noribumi Sato, Saitama (JP); Mitsuru Iioka, Saitama (JP); Takaya Nagasaki, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 726 days.

(21) Appl. No.: 12/509,767

(22) Filed: Jul. 27, 2009

(65) Prior Publication Data

US 2010/0073729 A1 Mar. 25, 2010

(30) Foreign Application Priority Data

Sep. 25, 2008 (JP) ................................ 2008-245856

(51) Int. Cl.

| | |
|---|---|
| ***G06K 15/00*** | (2006.01) |
| ***G06K 9/00*** | (2006.01) |
| ***G06K 9/34*** | (2006.01) |
| ***G06K 9/36*** | (2006.01) |
| ***G06K 9/54*** | (2006.01) |
| ***H04N 1/40*** | (2006.01) |

(52) U.S. Cl. ...... 358/3.24; 358/3.28; 382/100; 382/162; 382/175; 382/284; 382/306

(58) Field of Classification Search ................. 358/3.24, 358/3.28; 382/284, 175, 306, 100, 162

See application file for complete search history.

(56) References Cited

U.S. PATENT DOCUMENTS

| | | | | |
|---|---|---|---|---|
| 7,454,086 | B2 * | 11/2008 | Erol | 382/284 |
| 7,916,353 | B2 * | 3/2011 | Miyata | 358/3.28 |
| 2006/0072779 | A1 | 4/2006 | Erol | |
| 2009/0028382 | A1 | 1/2009 | Erol | |

FOREIGN PATENT DOCUMENTS

| | | |
|---|---|---|
| JP | B2 3242256 | 10/2001 |
| JP | A-2002-15290 | 1/2002 |
| JP | A-2005-304010 | 10/2005 |
| JP | A-2006-99767 | 4/2006 |
| JP | A-2007-124554 | 5/2007 |
| JP | A-2009-23270 | 2/2009 |

* cited by examiner

*Primary Examiner* — Charlotte M Baker
(74) *Attorney, Agent, or Firm* — Oliff & Berridge, PLC

(57) ABSTRACT

An image forming apparatus includes a print data receiving unit that receives print data designating black as a color material for printing a code information portion; a discriminating unit that discriminates as to whether or not black as a color material is in a usable state; a print data generation unit that generates, when the discriminating unit discriminates that the color material of black is not the usable state, the print data that changes a designation of the color material of black as to the code information portion of the print data received by the print data receiving portion into a designation of other color material enabling the code information to be read by a code information reading apparatus; and an image forming unit that forms an image by the print data thus changed by the print data generation unit.

10 Claims, 11 Drawing Sheets

IMAGE FORMING APPARATUS AND COMPUTER READABLE MEDIUM FOR CONTROLLING IMAGE FORM

CROSS-REFERENCE TO RELATED APPLICATION

This application is based on and claims priority under 35 USC 119 from Japanese Patent Application No. 2008-245856 filed Sep. 25, 2008.

BACKGROUND

1. Technical Field

The present invention relates to an image forming apparatus and an image forming control program.

2. Related Art

Code information represented by bar code is indispensably required to be printed in a state that the code information is read accurately since it is necessary to discriminate information due to its characteristics.

SUMMARY

According to an aspect of the invention, an image forming apparatus includes a print data receiving unit that receives print data designating black as a color material for printing a code information portion; a discriminating unit that discriminates as to whether or not black as a color material is in a usable state; a print data generation unit that generates, when the discriminating unit discriminates that the color material of black is not the usable state, the print data that changes a designation of the color material of black as to the code information portion of the print data received by the print data receiving portion into a designation of other color material enabling the code information to be read by a code information reading apparatus; and an image forming unit that forms an image by the print data thus changed by the print data generation unit.

BRIEF DESCRIPTION OF THE DRAWINGS

Exemplary embodiments of the invention will be described in detail based on the following figures, wherein.

DETAILED DESCRIPTION

Hereinafter, an exemplary embodiment of an image forming apparatus according to the invention will be explained in detail with reference to drawings.

The image forming apparatus according to the invention is configured by an electrophotographic printer, for example, and prints print data requested for printing on a print medium by using plural color material. The printer copes with a multicolor printing and mounts thereon a transfer mechanism for transferring respective color material of C (cyan), M (magenta), Y (yellow) and K (black) on the print medium.

Color material other than these color material is generated by mixing the respective color material with a predetermined ratio. For example, the color material "green" is generated by mixing cyan and yellow with a ratio of 1:1, whilst the color material of gray or black is generated by mixing all the color material. The color material generated by mixing the plural color material in this manner is called a process color, and in particular, black generated from the process colors is called a process black.

The print output using the process colors is realized by the superimposed printing by mixing the color material other than black, that is, cyan, magenta and yellow (these color material is collectively called "CMY colors".

[First Exemplary Embodiment]

Figure 1:
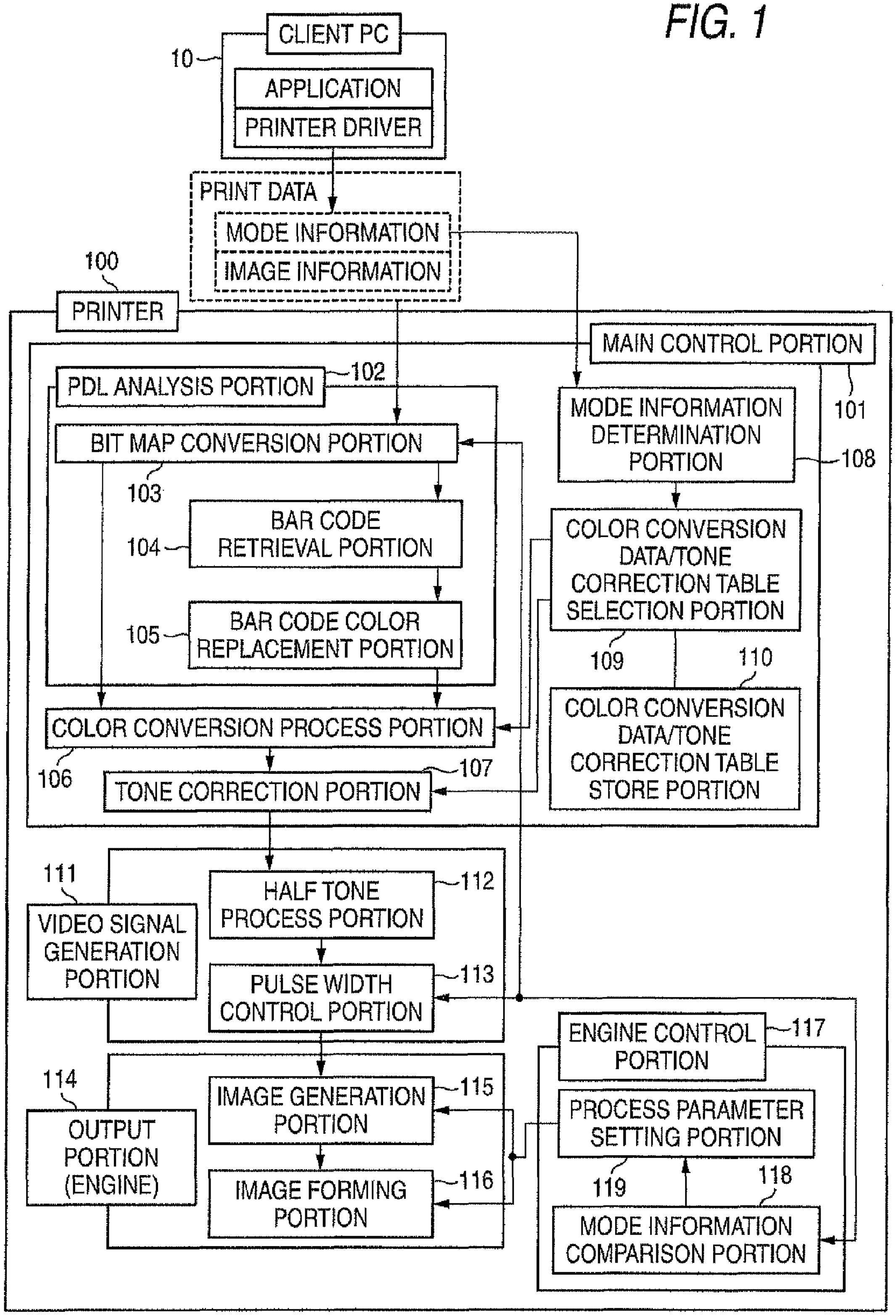
FIG. 1 is an example of a diagram illustrating the configuration of an image forming apparatus according to the exemplary embodiment of the invention and the image forming apparatus configured by applying an image forming control program.

FIG. 1 is an example of a diagram illustrating the configuration of the image forming apparatus according to the exemplary embodiment of the invention and the image forming apparatus configured by applying an image forming control program.

In the first exemplary embodiment, a code information portion such as a bar code or a two-dimensional bar code is drawn by using color material (cyan, magenta, yellow) other than black in a state where black can not be used, for example, in a state of the shortage of the remaining amount of the color material or in a failure state. Hereinafter, the explanation will be made as to a bar code as an example of the code information portion.

Figure 5A:
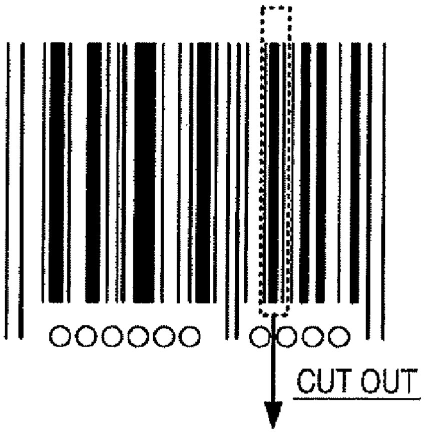
FIGS. 5A-5E are diagrams showing reflection factors at the time of printing out a bar code using color materials.

The bar code is code information formed by continued plural of parallel ruled lines having different thicknesses as shown in FIG. 5A.

In FIG. 1, print subject data generated by an application installed in a client PC 10 as a print requestor is transmitted to a print driver also installed therein. The print subject data generated by the application is configured by R (red), G (green) and B (blue).

The print driver generates print data of the PDL (Page Description Language) format capable of being processed at a printer 100 based on the print subject data and transmits the print data to the designated printer 100.

The print data generated by the printer driver includes mode information as well as image information as the print data. The mode information is information representing whether or not a bar code is added to the print data.

In FIG. 1, the print data configured by the mode information and the image information is shown by dotted lines.

The printer 100 is configured by a main control portion 101, a PDL analysis portion 102, a bit map conversion portion 103, a bar code retrieval portion 104, a bar code color replacement portion 105, a color conversion process portion 106, a tone correction portion 107, a mode information determination portion 108, a color conversion data/tone correction table selection portion 109, a color conversion data/tone correction table store portion 110, a video signal generation portion 111, a half tone process portion 112, a pulse width control portion 113, an output portion 114, an image generation portion 115, an image forming portion 116, an engine control portion 117, a mode information comparison portion 118 and a process parameter setting portion 119. The main control portion 101 receives the print data transmitted from the client PC 10 via a communication interface (not shown).

The main control portion 101 is also called as a controller and performs a print control for enabling the print output based on the print request. Of the print subject data received by the main control portion 101, the image information is received by the PDL analysis portion 102 and the mode information is received by the mode information determination portion 108.

The mode information determination portion 108 determines based on the mode information whether or not a mode is a bar code output mode representing that the print data contains a bar code and notifies the determination result representing the bar code output mode or not to the color conversion data/tone correction table selection portion 109. When the color conversion data/tone correction table selection portion 109 receives the determination result representing the bar code output mode, the selection portion selects color conversion data and a tone correction table used for the print output of the bar code to be stored in the color conversion data/tone correction table store portion 110.

In contrast, the PDL analysis portion 102 analyzes the print data of the PDL format. The PDL analysis portion 102 includes the bit map conversion portion 103, the bar code retrieval portion 104 and the bar code color replacement portion 105. The bit map conversion portion 103 subjects the print data of the PDL format to a rasterizing processing to thereby convert into the print data of the bit map format.

The print data thus converted into the bit map format by the portion 103 is transmitted to the bar code retrieval portion 104 and the color conversion process portion 106. The bar code retrieval portion 104 retrieves the bar code from the print data of the bit map format, and when the bar code is retrieved, the retrieval portion transmits information representing that the print data contains the bar code and position information representing the position of the bar code within the print data to the bar code color replacement portion 105. When the bar code is not retrieved, the retrieval portion also transmits information representing that the bar code is not retrieved to the bar code color replacement portion 105.

When the print data contains a single bar code or plural bar codes, each of the bar codes can be processed based on the position information.

When the bar code color replacement portion 105 receives the position information, the replacement portion performs the replacement processing of the color for drawing the bar code located at the position represented by the position information, that is, replaces the color drawing the bar code by cyan or the process black formed by mixing the CMY colors. In particular, when the bar code is required to be visually recognized by a color similar to black, the color drawing the bar code is replaced not by cyan but by the process black.

Figure 4:
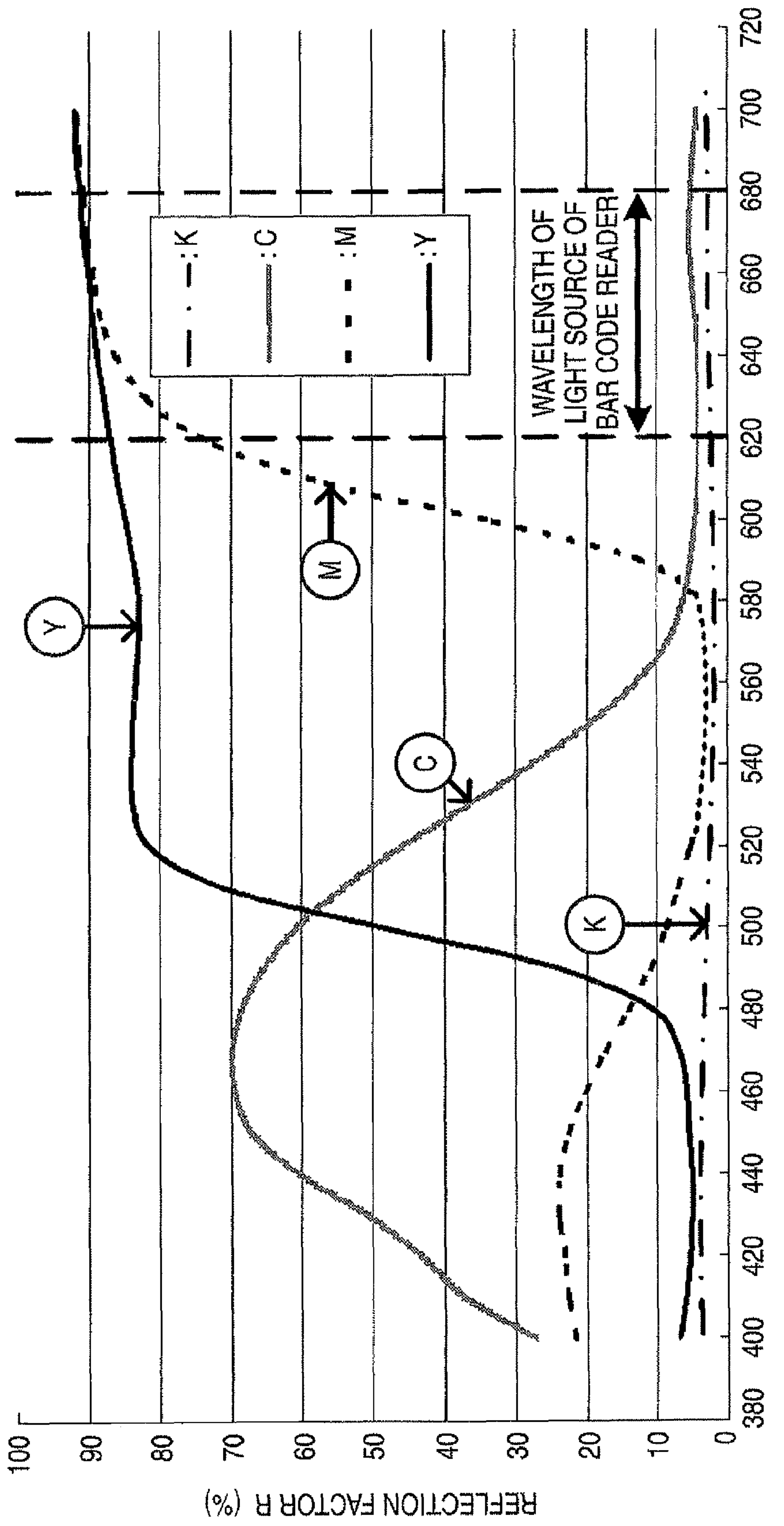
FIG. 4 is a diagram showing reflection factors of respective color material.

FIG. 4 is a diagram showing the absorption spectrum of toner ink used as general color material, in which an abscissa represents the wavelength [nm] and an ordinate represents a reflection factor [%].

A bar code reader generally reads the wavelength in a range of 620 nm to 680 nm of a red wavelength region. Concerning the reflection factors shown by the absorption spectra of the respective toners having the wavelength range of 620 nm to 680 nm shown in FIG. 4, each of yellow (Y) and magenta (M) has a high reflection factor in a range of almost "70% to 90%", whilst each of cyan (C) and black (K) has a low reflection factor in a range of almost "5%".

That is, when a bar code is printed on a print medium (print sheet) of white having a high reflection factor by using yellow (Y) or magenta (M) having a high reflection factor, the bar code reader can not recognize the bar code with a high probability (can not read the bar code).

In contrast, when a bar code is printed on a print medium print sheet) of white having a high reflection factor by using cyan (C) or black (K) having a low reflection factor, the bar code reader can recognize the bar code with a high probability due to the difference of the reflection factor. Since the printer shown in FIG. 1 can not use the color material of black (K), the bar code color replacement portion 105 replaces the color used for printing by cyan (C) or the process black. The process black replaced by the bar code color replacement portion 105 is generated by mixing yellow (Y) and magenta (M) each having the high reflection factor with cyan (C) having the low reflection factor. When the bar code color replacement portion 105 is notified from the bar code retrieval portion 104 that a bar code is not retrieved, the replacement portion transfers this notification to the color conversion process portion 106.When the bar code color replacement portion 105 replaces the color for printing a bar code by cyan or the process black, the replacement bar code color replacement portion 105 notifies the color information after the replacement to the color conversion process portion 106. When the color conversion process portion 106 receives the print data of the bit map format received from the bit map conversion portion 103 of the PDL analysis portion 102 and the color information notified from the bar code color replacement portion 105, this process portion performs the color conversion by using the color conversion data selected by the color conversion data/tone correction table selection portion 109. The color conversion process portion 106 performs the color conversion processing in a manner that the color of the bar code contained in the print data is converted into the color (cyan or the process black) based on the color information and the color of a portion other than the bar code is converted into the CMY colors from the color of R (red), G (green) and B (blue) (hereinafter called "RGB colors" designated by the application. When the color conversion process portion 106 is notified from the bar code color replacement portion 105 that a bar code is not retrieved, this process portion converts the color of the entirety of the print data into the CMY colors from the RGB colors.

The color conversion process portion 106 thus performed the color conversion processing transmits the print data thus subjected to the conversion processing into the CMY colors to the tone correction portion 107. The tone correction portion 107 performs tone correction by using the tone correction table selected by the color conversion data/tone correction table selection portion 109.

Figure 6A:
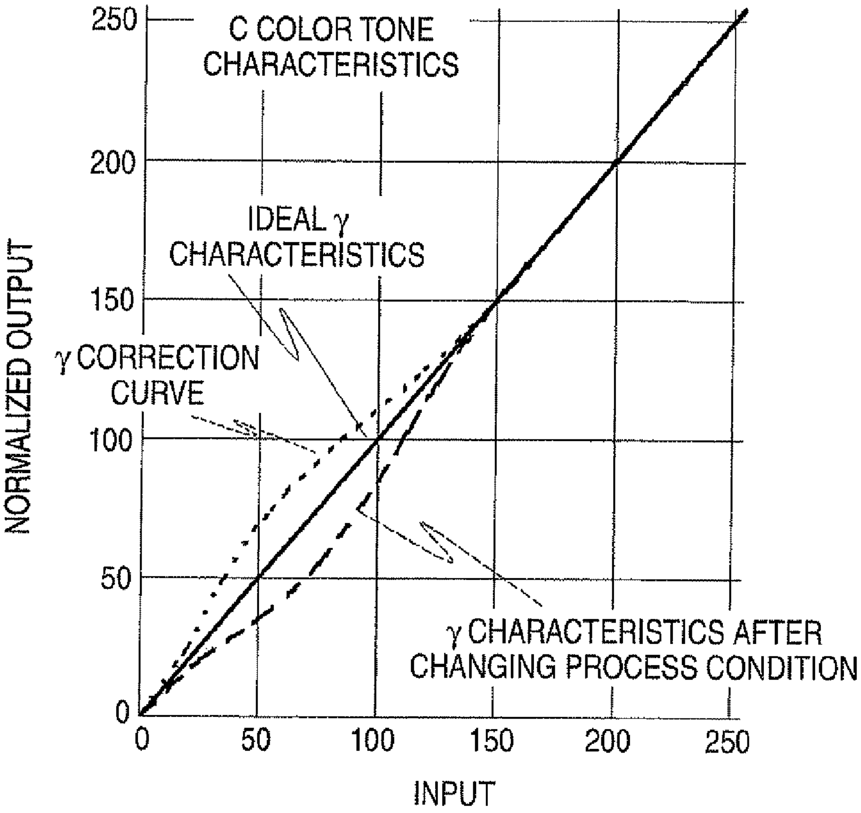
FIGS. 6A-6D are diagrams showing tone characteristics.
Figure 6B:
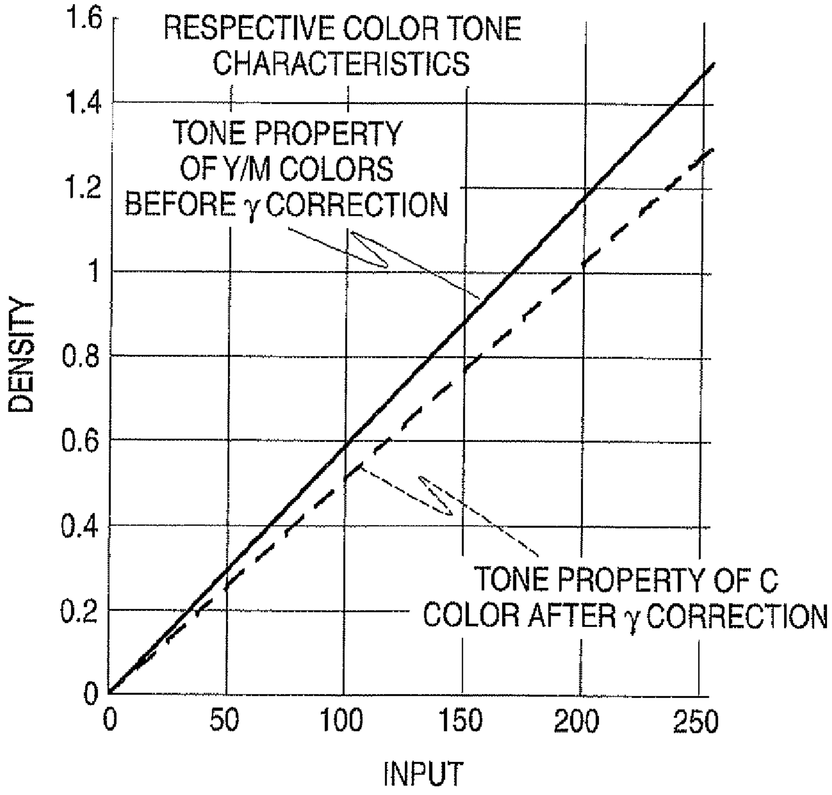
Figure 6C:
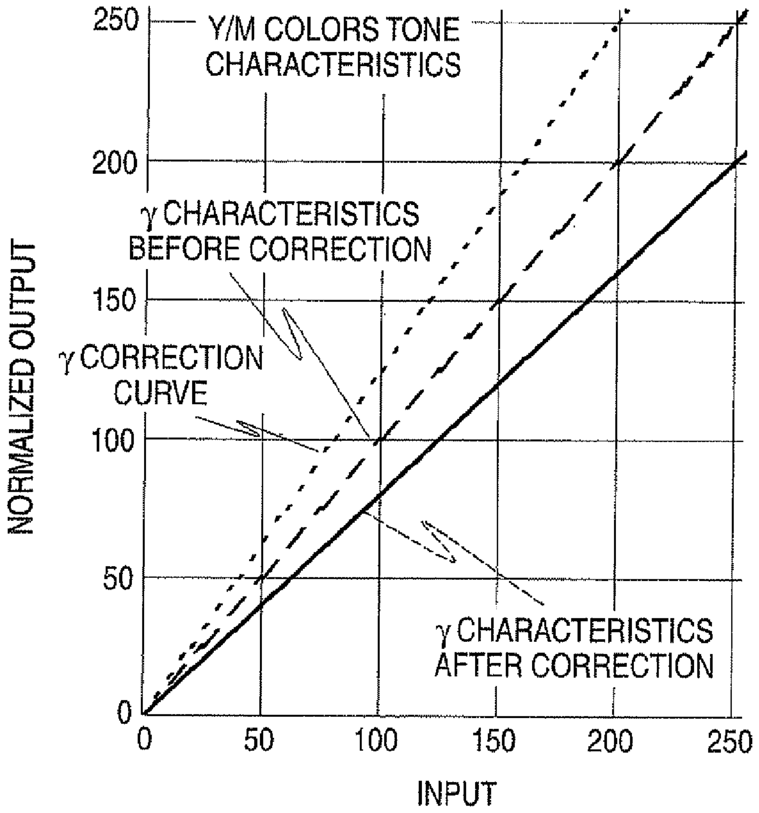
Figure 6D:
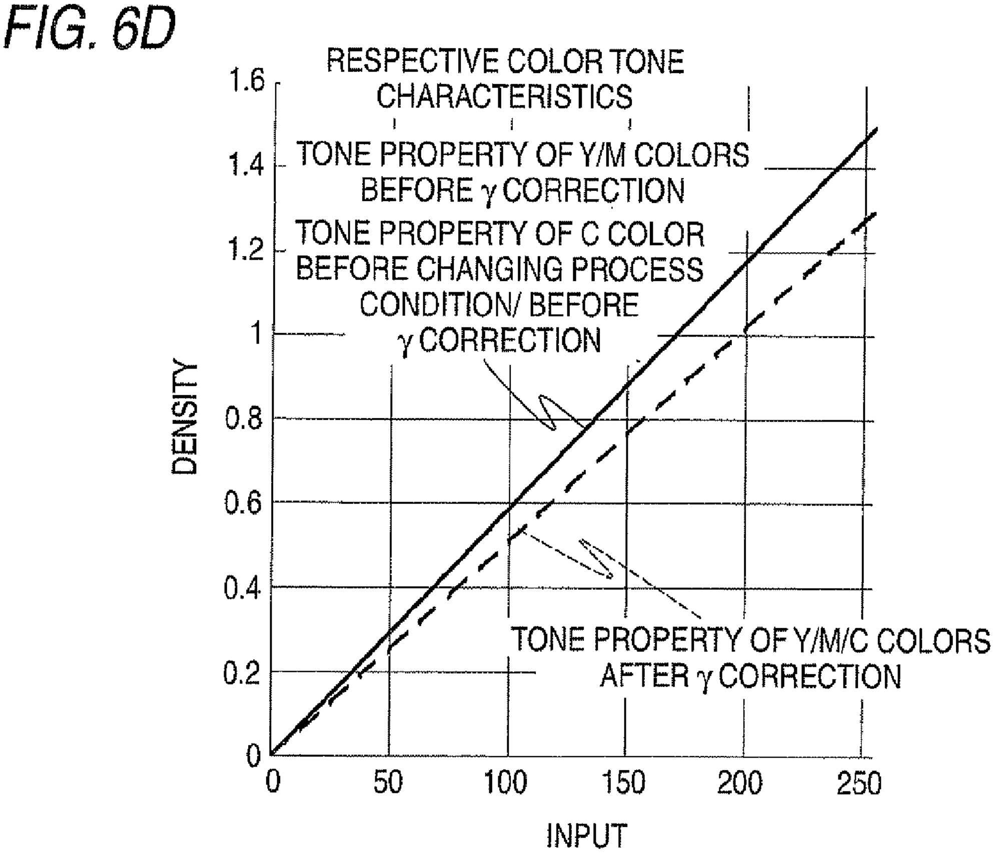

In the tone correction, when the gamma characteristics of cyan is distorted as shown in FIG. 6A and the color balance is deteriorated, the gamma correction is performed by using the gamma correction table formed by the gamma correction curve shown in FIG. 6A, whereby the ideal gamma characteristics shown in FIG. 6A can be obtained. Further, the optimum tone characteristics can be obtained by performing the gamma correction shown in FIGS. 6B, 6C and 6D also with respect to the process black.

When the tone correction is performed in this manner, the tone correction portion 107 transmits the print data to the video signal generation portion 111. The video signal generation portion 111 generates a video signal of the print data for printing the color material on a print medium such as a print sheet. The video signal generation portion 111 is configured by the half tone process portion 112 and the pulse width control portion 113. The half tone process portion 112 receives the print data transmitted from the tone correction portion 107.

The half tone process portion 112 performs a half tone processing for representing the intermediate color of the print data after the tone correction and transmits the print data subjected to the half tone processing to the pulse width control portion 113. The pulse width control portion 113 controls the pulse width for each pixel in order to reproduce the CMY colors converted by the color conversion processing.

Then, the video signal generation portion 111 transmits the print data to the output portion 114. The output portion 114 is an engine portion for printing out the print data on a print medium such as a print sheet and is configured by the image generation portion 115 and the image forming portion 116.

The output portion 114 configured by the image generation portion 115 and the image forming portion 116 performs the processing based on parameter setting information from the engine control portion 117. The engine control portion 117 is configured by the mode information comparison portion 118 and the process parameter setting portion 119. The mode information comparison portion 118 checks whether or not the mode information of the print data requested for printing is a bar code output mode, and notifies that the mode information is the bar code output mode to the process parameter setting portion 119 when the mode information is the bar code output mode.

The process parameter setting portion 119 transmits the parameter setting information, designating the superimposing order of the color material at the time of printing the bar code, to the image generation portion 115 and the image forming portion 116 of the output portion 114.

The image generation portion 115 of the output portion 114 generates an image based on the print data transmitted from the video signal generation portion 111 and the parameter setting information received from the process parameter setting portion 119.

Then, the image forming portion 116 forms an image (outputs a printed image) of the print data based on the image generated from the image generation portion 115.

In the image forming process for an image based on the parameter setting information performed by the image forming portion 116, the explanation will be made as to the printing process of the bar code using the process black.

When the color after the color conversion for printing out the bar code is the process black, such a processing is performed in which only cyan constituting the process black is reduced.

This processing is configured by a processing of reducing the print data by about one pixel, or a processing of reducing a used amount (exposed light amount) of the respective colors of the CMY colors used for the process black, or a processing of changing the bias condition in which electric charge in opposite to that of the color material of the respective colors is applied.

As shown in FIG. 7, the process black formed by three colors CMY is generated by sandwiching cyan (C) with a low reflection factor between magenta (M) and yellow (Y), that is, by superimposing cyan as an intermediate layer of the three layer structure.

FIG. 7 is diagrams showing a color mixing processing of the process black formed by three colors CMY. This processing is particularly useful for a printer of 4 cycle type. FIGS. 7A and 7B show an example where the process black is generated by sequentially superimposing color material placed on a photo receptor drum on an intermediate transfer belt.

That is, the process black is generated by superimposing the three colors in the order of magenta (M), cyan (C) and yellow (Y) or in the order of yellow (Y), cyan (C) and magenta (M).

Figure 7A:
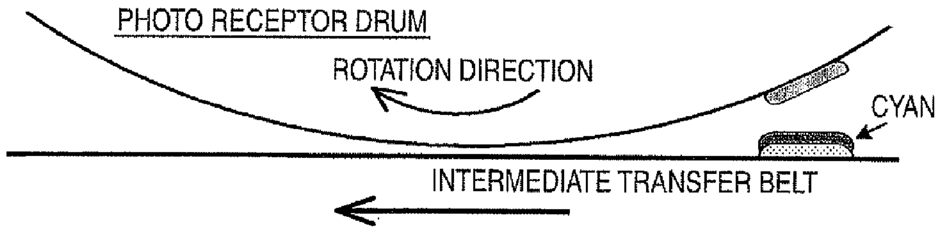
FIGS. 7A-7D are diagrams showing print outputs by superimposing respective color material.
Figure 7B:
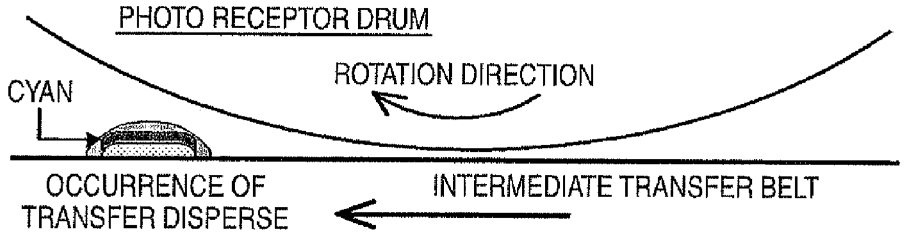

As shown in FIG. 7B, in the case of superimposing all the colors CMY, even when the color material of magenta or yellow superimposed at the uppermost position disperses, the influence of such the phenomenon can be suppressed to the minimum as to cyan (C) with the low reflection factor located at the intermediate layer.

Figure 7C:
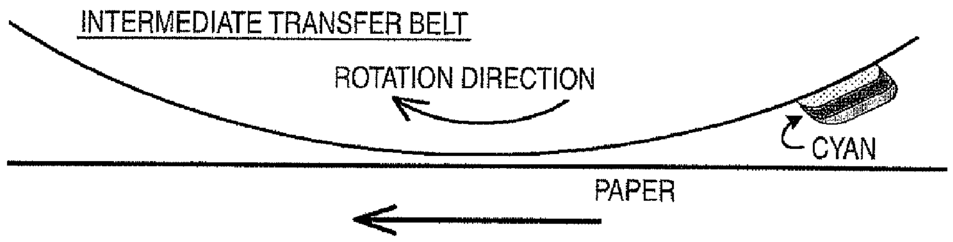
Figure 7D:
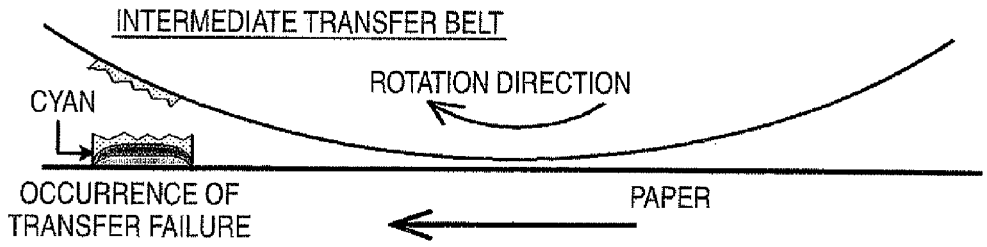

FIGS. 7C and 7D are diagrams illustrating that the intermediate transfer belt on which the three colors CMY are superimposed as shown in FIG. 7D is further rotated and the superimposed colors are transferred on a print sheet. When the process black generated by superimposing cyan as the intermediate layer as shown in FIG. 7C is transferred to a print sheet as shown in FIG. 7D, even when the transfer failure occurs at the color material of magenta or yellow disposed at the uppermost position, the influence of such the failure can be suppressed to the minimum as to cyan (C) located at the intermediate layer.

Figure 5B:
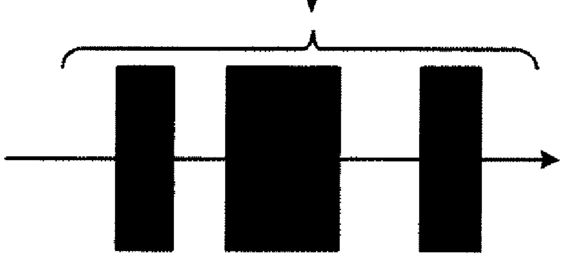
Figure 5C:
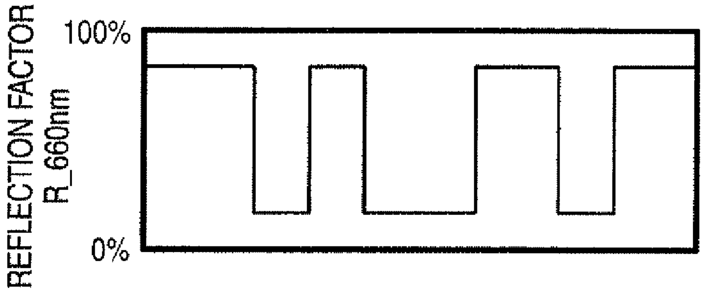
Figure 5D:
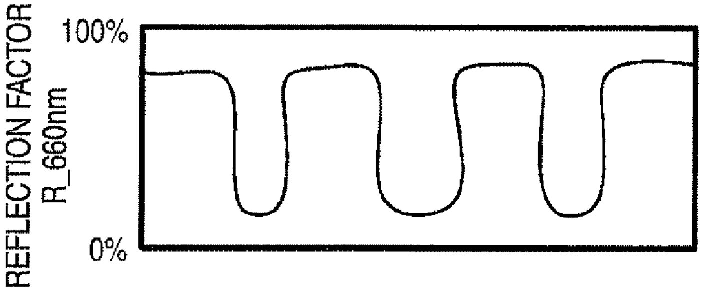

When the bar code is printed by the process black or cyan in this manner, the bar code has the reflection factor shown in FIG. 5D.

FIG. 5 A is a diagram showing an example of the bar code used in the above case and FIG. 5B is an enlarged diagram of a part of the bar code shown in FIG. 5A. FIGS. 5C, 5D and 5E are diagrams respectively showing the reflection factors of the parts of the bar code shown in FIG. 5B in the enlarged manner.

Figure 5E:
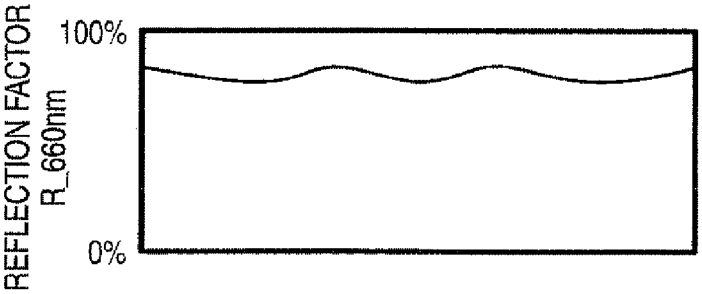

FIG. 5C is a diagram showing the profile of ideal reflection factors, FIG. 5D is a diagram showing the profile of the reflection factors of the bar code printed by using the process black or cyan, and FIG. 5E is a diagram showing the profile of the reflection factors of the bar code printed by using yellow, or magenta or the mixture of yellow and magenta.

The profile of the ideal reflection factors shown in FIG. 5C represents a waveform based on the sizes of the respective parts of the bar code. According to the profile of the reflection factors of the bar code printed by using the process black or cyan shown in FIG. 5D, since the reflection factor of the bar code differs largely from the reflection factor of the portion other than the bar code, the bar code can be recognized.

In contrast, according to the profile of the reflection factors of the bar code printed by using yellow or magenta or the mixed color of yellow and magenta shown in FIG. 5E, since the difference between the reflection factor of the bar code and the reflection factor of the portion other than the bar code is quite small, the bar code can not be recognized.

Figure 2:
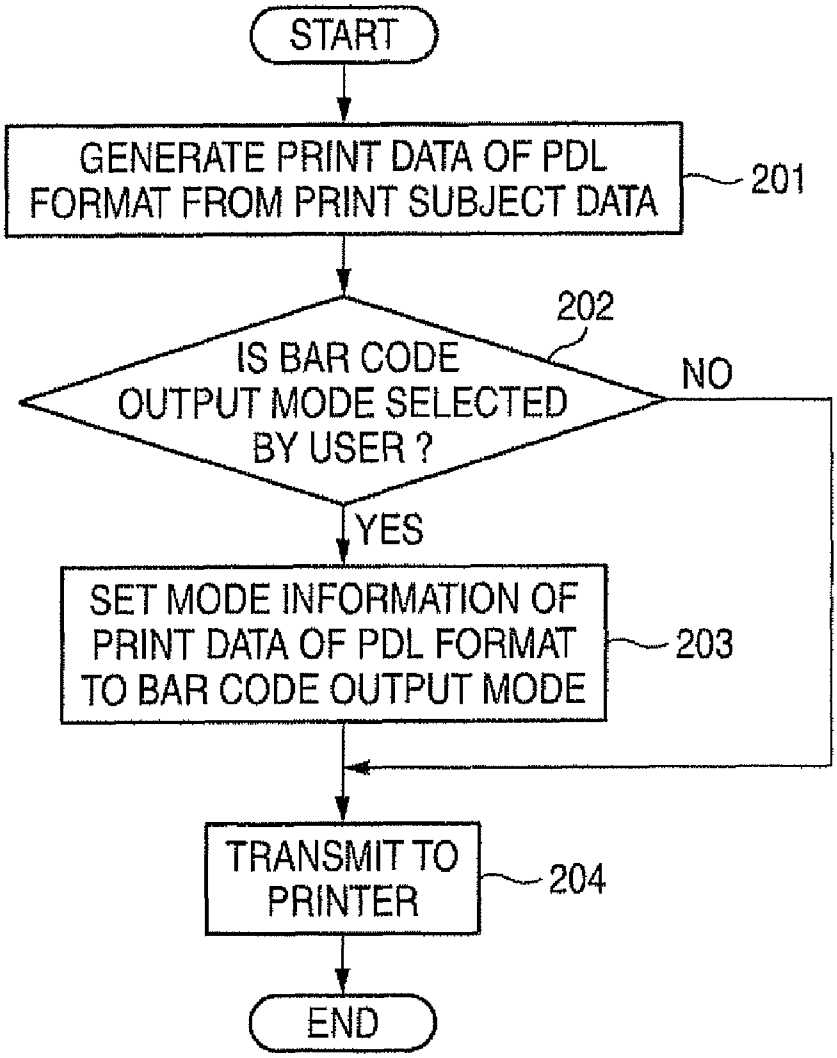
FIG. 2 is a flowchart showing the processing performed by a client PC for issuing a print request to the image forming apparatus according to the exemplary embodiment of the invention.

FIG. 2 is a flowchart showing the processing performed by the client PC for issuing the print request to the image forming apparatus according to the exemplary embodiment of the invention.

In FIG. 2, when the print-out of the print subject data generated by the predetermined application installed in the client PC is operated, the print data of the PDL format is generated based on the print subject data (201).

Succeedingly, it is determined whether or not a user selects the bar code output mode by operating the print-out (202). When the bar code output mode is selected (Yes in 202), the mode information of the print data of the PDL format is set to the bar code output mode (203). When the bar code output mode is not selected (No in 202), nothing is set as the mode information.

The print data is transmitted to the printer (204).

Figure 3:
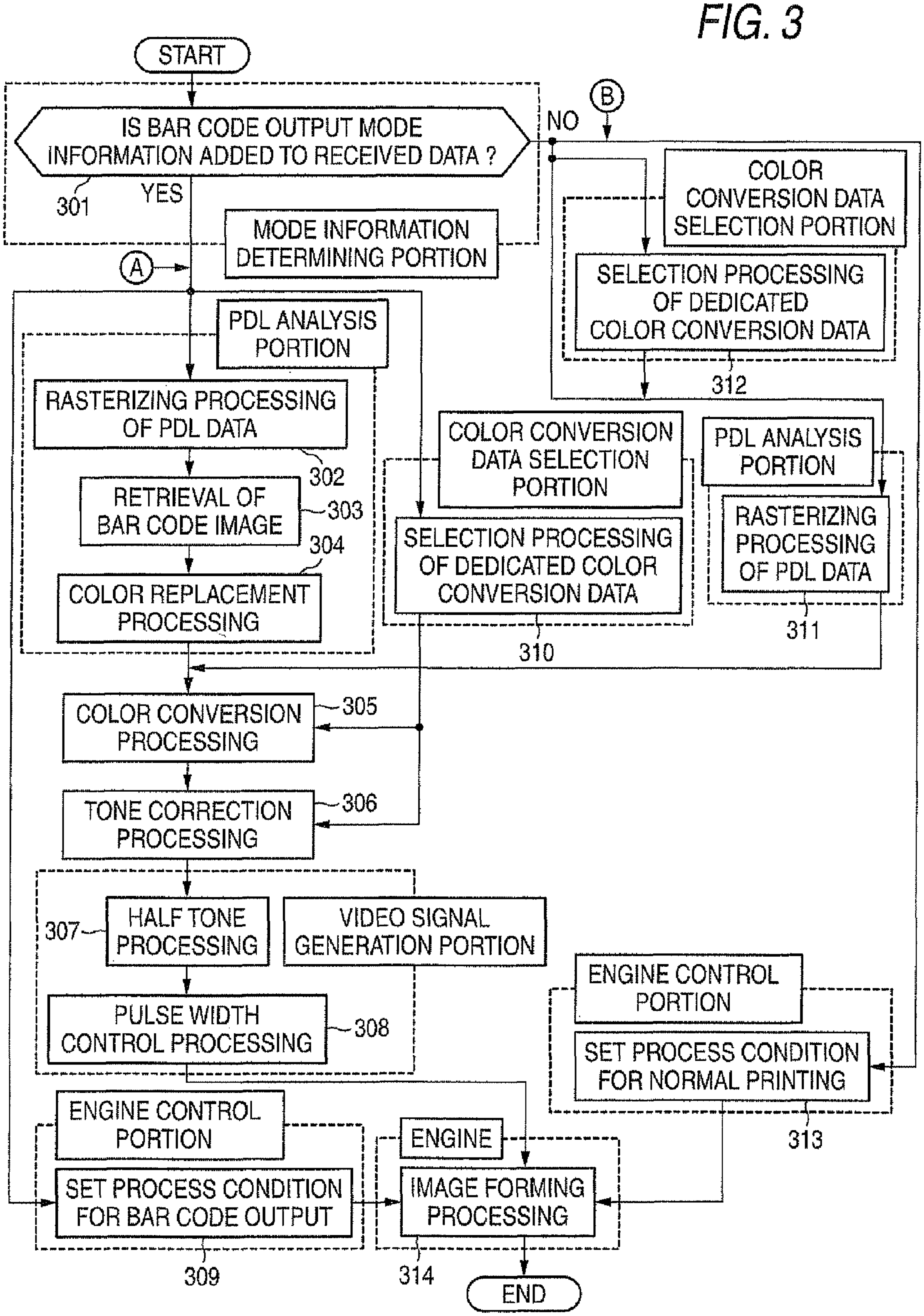
FIG. 3 is a flowchart showing the processing performed by the image forming apparatus according to the exemplary embodiment of the invention.

FIG. 3 is a flowchart showing the processing performed by the image forming apparatus according to the exemplary embodiment of the invention.

In FIG. 3, the processing is started when the print data is received from the client PC, and it is determined whether or not the bar code output mode is set as the mode information of the print data thus received (301). When the bar code output mode is set (Yes in 301), the process condition in the print output at the time of outputting a printed image is set for the bar code printing (309), and the print data is subjected to the rasterizing processing to thereby generate a bit map image (302). Further, the color conversion data for setting the color used for printing the bar code is selected (310).

Succeedingly, a bar code image representing a bar code is retrieved by using the bit map image thus generated by the rasterizing processing (303). When the bar code image is retrieved, the color for printing the bar code of the bar code image is replaced by cyan or the process black (304).

Then, the print data of the bit map image formed by the RGB colors is subjected to the color conversion processing by using the selected color conversion data so as to be converted into the CMY colors (305). When the color conversion processing is performed, the tone correction is performed (306).

Further, the print data of the bit map image is subjected to a halftone processing (307) and a pulse width control processing (308).

The print data of the bit map image having been subjected to these processings is further subjected to the image forming processing for outputting a printed image based on the process condition set for the bar code printing (314).

[Second Exemplary Embodiment]

Figure 8:
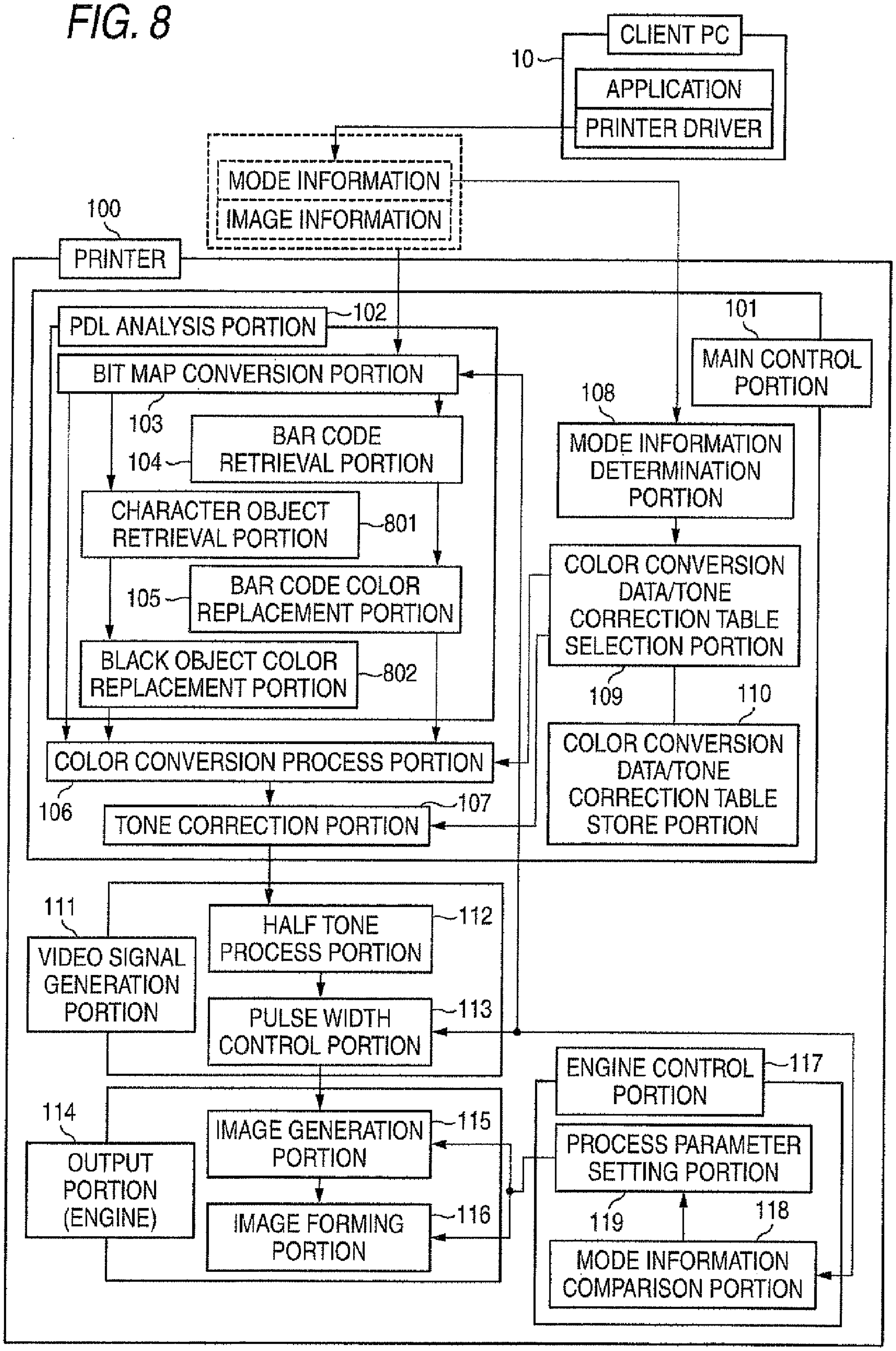
FIG. 8 is an example of a diagram illustrating the configuration of the image forming apparatus according to the exemplary embodiment of the invention and the image forming apparatus configured by applying the image forming control program.

FIG. 8 is an example of a diagram illustrating the configuration of the image forming apparatus according to the exemplary embodiment of the invention and the image forming apparatus configured by applying the image forming control program.

In the second exemplary embodiment, a bar code is printed by color material different from color material used for printing other print data other than the bar code.

In FIG. 8, print subject data generated by the application installed in the client PC200 as the print requestor is transmitted to the print driver also installed therein. The print subject data generated by the application is configured by R (red), G (green) and B (blue).

The print driver generates print data of the PDL (Page Description Language) format capable of being processed at the printer 100 based on the print subject data and transmits the print data to the designated printer 100.

The print data generated from the printer driver includes mode information as well as image information as the print data.

The mode information includes the information representing whether or not a bar code is added to the print data. When this information represents that a bar code is added to the print data, the mode information further includes information representing whether the mode is "a character priority mode" for printing out characters constituting the print data in preference to the bar code or "a picture priority mode" for printing out a picture constituting the print data in preference to the bar code.

In the character priority mode, the color material used at the time of printing the character information other than the bar code is set to have a higher priority than the color material for printing the bar code, and the bar code is printed out by using color material other than the color material used for printing out the character information other than the bar code.

In the picture priority mode, the color material used at the time of printing the picture information other than the bar code is set to have a higher priority than the color material for printing the bar code, and the bar code is printed out by using color material other than the color material used for printing out the character information other than the bar code.

The printer 100 is configured by the main control portion 101, the PDL analysis portion 102, the bit map conversion portion 103, the bar code retrieval portion 104, the bar code color replacement portion 105, the color conversion process portion 106, the portion 107, the mode information determination portion 108, the color conversion data/tone correction table selection portion 109, the color conversion data/tone correction table store portion 110, the video signal generation portion 111, the half tone process portion 112, the pulse width control portion 113, the output portion 114, the image generation portion 115, the image forming portion 116, the engine control portion 117, the mode information comparison portion 118, the process parameter setting portion 119, a character object retrieval portion 801 and a black object color replacement portion 802. The main control portion 101 receives the print data transmitted from the client PC 10 via the communication interface (not shown).

The main control portion 101 is also called as the controller and performs the print control for enabling the print output based on the print request. The image information of the print data received by the main control portion 101 is received by the PDL analysis portion 102 and the mode information is received by the mode information determination portion 108.

The mode information determination portion 108 determines based on the mode information whether or not a mode is the bar code output mode representing that the print data contains a bar code, and when it is determined to be the bar code output mode, further determines whether or not the character priority mode or the picture priority mode is designated. These determination results are notified to the color conversion data/tone correction table selection portion 109. When the color conversion data/tone correction table selection portion 109 receives the determination result representing the bar code output mode and representing that the character priority mode or the picture priority mode is designated, the selection portion selects color conversion data and the tone correction table used for the print output of the bar code to be stored in the color conversion data/tone correction table store portion 110.

In contrast, the PDL analysis portion 102 analyzes the print data of the PDL format. The PDL analysis portion 102 includes the bit map conversion portion 103, the bar code retrieval portion 104, the bar code color replacement portion 105, the character object retrieval portion 801 and the black object color replacement portion 802. The bit map conversion portion 103 subjects the print data of the PDL format to the rasterizing processing to thereby convert into the print data of the bit map format.

The print data thus converted into the bit map format by the portion 103 is transmitted to the bar code retrieval portion 104, the character object retrieval portion 801 and the color conversion process portion 106. The print data of the bit map format is transmitted to the character object retrieval portion 801 when the character priority mode is designated, whilst transmitted to the color conversion process portion 106 when the picture priority mode is designated.

The bar code retrieval portion 104 retrieves the bar code from the print data of the bit map format, and when the bar code is retrieved, the retrieval portion transmits information representing that the print data contains the bar code and position information representing the position of the bar code within the print data to the bar code color replacement portion 105. When the bar code is not retrieved, the retrieval portion also transmits information representing that the bar code is not retrieved to the bar code color replacement portion 105.

When the print data contains a single bar code or plural bar codes, each of the bar codes can be processed based on the position information.

When the bar code color replacement portion 105 receives the position information, the replacement portion performs the replacement processing of the color for drawing the bar code located at the position represented by the position information.

In the color replacement processing, when the "character priority mode" is selected as the mode information, color material different from the color material used for printing out the characters is selected. For example, when the characters are designated so as to be printed by black, cyan or the process black formed by superimposing the color material including cyan is selected as the color material for printing the bar code.

In contrast, when the "picture priority mode" is selected as the mode information, black of a single color is selected as the color material for printing the bar code.

When the bar code color replacement portion 105 is notified from the bar code retrieval portion 104 that a bar code is not retrieved, the replacement portion transfers this notification to the color conversion process portion 106. When the bar code color replacement portion 105 determines the color material for printing a bar code and replaces the color for printing the bar code, the replacement bar code color replacement portion 105 notifies the color information after the replacement to the color conversion process portion 106.

Next, when the character priority mode is designated, the character object retrieval portion 801 receives the print data and retrieves character objects from the print data. In this retrieval processing, the image information constituting the print data is separated for each object to thereby retrieve the character objects. When the retrieval processing is performed, then the character object color replacement portion 802 performs the replacement of color for printing the character objects. Normally, a single color of black is selected.

Of course, the character object color replacement portion 802 may perform the processing in cooperation with the bar code color replacement portion 105 so as to select different colors therebetween.

The color information after the replacement performed by the character object color replacement portion 802 is transmitted to the color conversion process portion 106.

The color conversion process portion 106 receives the print data from the bit map conversion portion 103. When the character priority mode is designated, this process portion receives the color information for printing the character objects from the character object color replacement portion 802 and also receives the color information for printing a bar code from the bar code color replacement portion 105.

The color conversion process portion 106 performs the color conversion processing of converting the RGB colors of the print data into the CMY colors, based on the received color information, by using the selected color conversion data and the selected tone correction table used for printing out the bar code by the color conversion data/tone correction table selection portion 109.

The process black is generated by using the CMY colors in the case where the character priority mode is selected, the color information for printing characters is a single color of black and the color information for printing the bar code is the process black. In contrast, full colors using the CMY colors are employed in the case where the picture priority mode is selected, the color information for printing a picture is full colors and the color information for printing the bar code is a single color of black.

The print data having been subjected to the color conversion processing in this manner is transmitted to the tone correction portion 107 and subjected to the tone correction by the tone correction portion 107 as shown in the first exemplary embodiment.

When the tone correction is performed in this manner, the tone correction portion 107 transmits the print data to the video signal generation portion 111. The video signal generation portion 111 generates the video signal of the print data for printing the color material on a print medium such as a print sheet. The video signal generation portion 111 is configured by the half tone process portion 112 and the pulse width control portion 113. The half tone process portion 112 receives the print data transmitted from the tone correction portion 107.

The half tone process portion 112 performs the half tone processing for representing the intermediate color of the print data after the tone correction and transmits the print data subjected to the halftone processing to the pulse width control portion 113. The pulse width control portion 113 controls the pulse width for each pixel in order to reproduce the CMY colors converted by the color conversion processing.

Then, the video signal generation portion 111 transmits the print data to the output portion 114. The output portion 114 is the engine portion for printing out the print data on a print medium such as a print sheet and is configured by the image generation portion 115 and the image forming portion 116.

The output portion 114 configured by the image generation portion 115 and the image forming portion 116 performs the processing based on the parameter setting information from the engine control portion 117. The engine control portion 117 is configured by the mode information comparison portion 118 and the process parameter setting portion 119. The mode information comparison portion 118 checks whether or not the mode information of the print data requested for printing is the bar code output mode, and notifies that the mode information is the bar code output mode to the process parameter setting portion 119 when the mode information is the bar code output mode.

The process parameter setting portion 119 transmits the parameter setting information, designating the superimposing order of the color material at the time of printing the bar code, to the image generation portion 115 and the image forming portion 116 of the output portion 114.

The image generation portion 115 of the output portion 114 generates an image based on the print data transmitted from the video signal generation portion 111 and the parameter setting information received from the process parameter setting portion 119.

Then, the image forming portion 116 forms an image (outputs a printed image) of the print data based on the image generated from the image generation portion 115.

Figure 9:
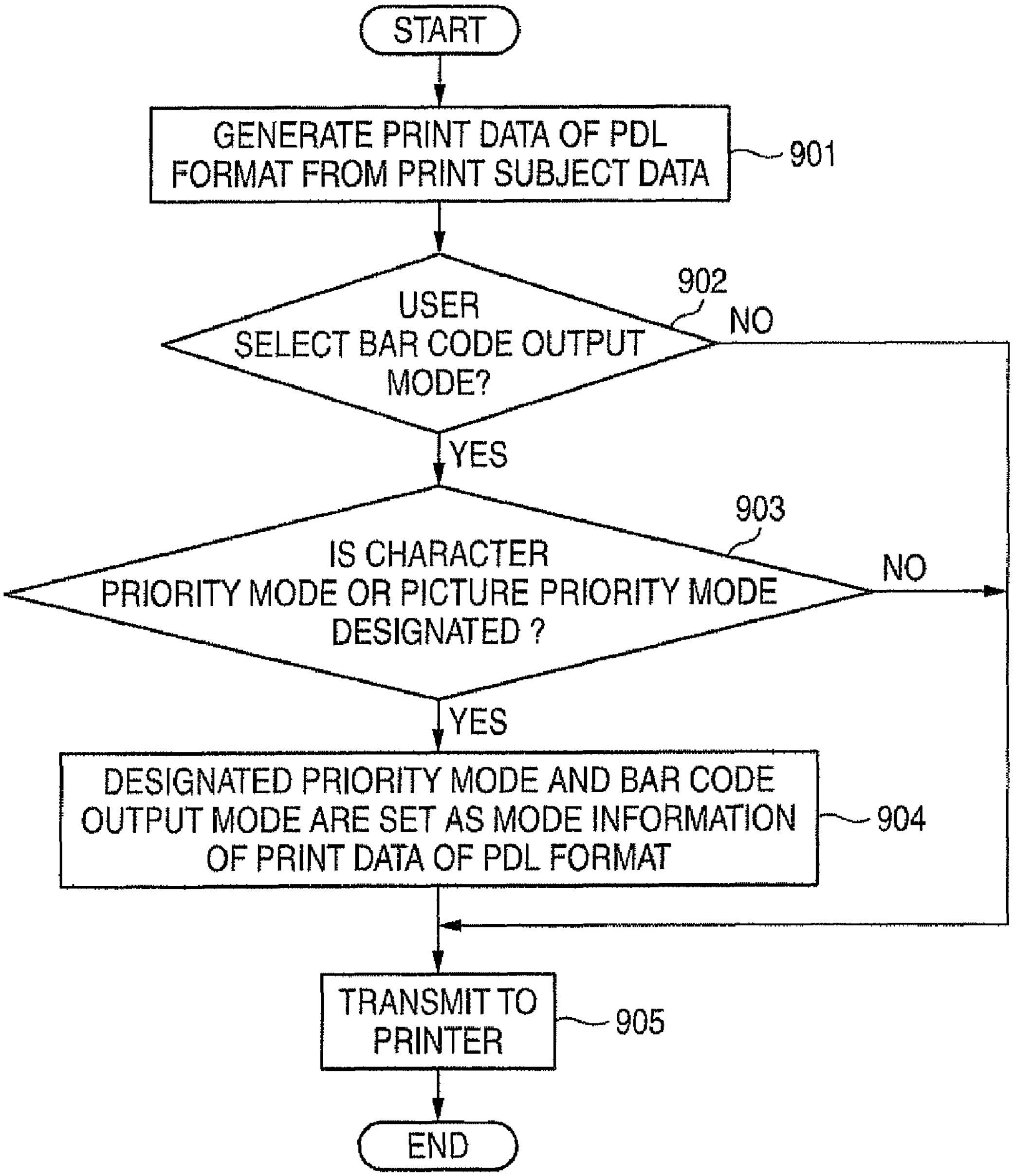
FIG. 9 is a flowchart showing a processing performed by the client PC for issuing the print request to the image forming apparatus according to the exemplary embodiment of the invention.

FIG. 9 is a flowchart showing the processing performed by the client PC for issuing the print request to the image forming apparatus according to the exemplary embodiment of the invention.

In FIG. 9, when the print-out of the print subject data generated by the predetermined application installed in the client PC is operated, the print data of the PDL format is generated based on the print subject data (901).

Succeedingly, it is determined whether or not a user selects the bar code output mode by operating the print-out (902). When the bar code output mode is selected (Yes in 902), it is determined whether or not the character priority mode or the picture priority mode is designated (903). When the character priority mode or the picture priority mode is designated (Yes in 903), the bar code output mode and one of the character priority mode and the picture priority mode are set as the mode information of the print data of the PDL format (904).

When the mode information is set to the print data, the print data including the mode information is transmitted to the printer (image forming apparatus) (905).

In contrast, when the bar code output mode is not selected (No in 902) or when none of the character priority mode and the picture priority mode are set although the bar code output mode is set (No in 903), the print data of the PDL format thus generated is transmitted to the printer (905).

Figure 10:
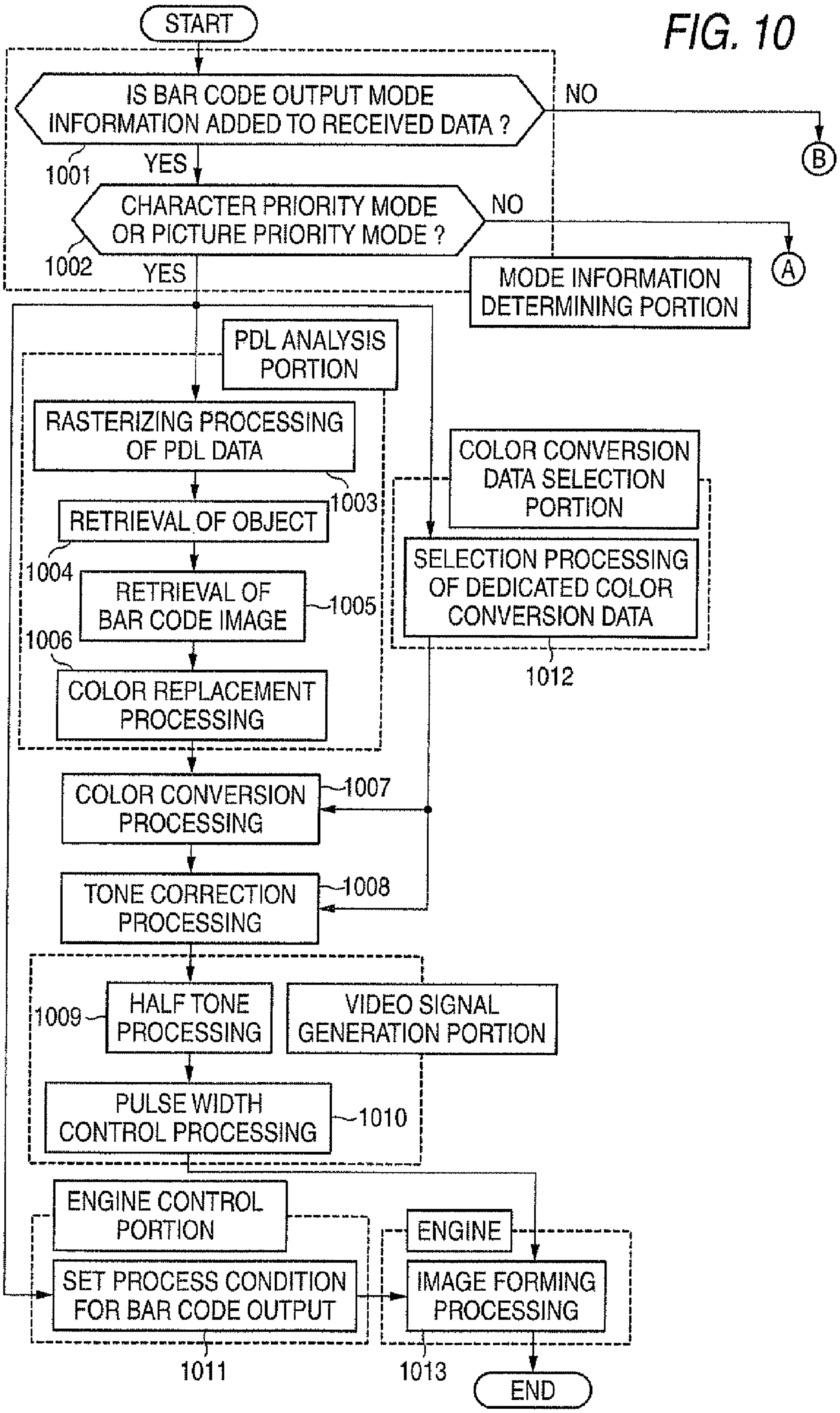
FIG. 10 is a flowchart showing the processing performed by the image forming apparatus according to the exemplary embodiment of the invention.

FIG. 10 is a flowchart showing the processing performed by the image forming apparatus according to the exemplary embodiment of the invention.

In FIG. 10, the processing is started when the print data is received from the client PC, and it is determined whether or not the bar code output mode is set as the mode information of the print data thus received (1001). When the bar code output mode is not set (No in 1001), the processing returns to a position B shown in FIG. 3.

In contrast, when the bar code output mode is set (Yes in 1001), succeedingly it is determined whether or not one of the character priority mode or the picture priority mode is set as the mode information (1002). When none of these priority modes are set (No in 1002), the processing returns to a position A shown in FIG. 3.

When one of these priority modes is set (Yes in 1002), the process condition at the time of printing out is set for the bar code printing (1011) and the print data is subjected to the rasterizing processing to generate a bit map image (1003).

Further, the color conversion data setting the color for printing the bar code is selected (1012).

Succeedingly, by using the bit map image thus generated by the rasterizing processing, a character object is retrieved in the case of the character priority mode, whilst an image (picture) object is retrieved in the case of the picture priority mode (1004). Then, a bar code is retrieved from the bit map image obtained by the rasterizing processing (1005).

When the bar code is retrieved, the color material of the bar code is replaced by color material different from that of the characters and the picture designated by the respective priority modes (1006). For example, when the characters are designated to be printed by a single color of black in the character priority mode, the color of the bar code is replaced by one of cyan, magenta, yellow and the process black. In contrast, when an image (picture) is designated to be printed by full colors in the picture priority mode, the color of the bar code is replaced by the single color of black.

The color(s) after the replacement is converted into the CMY colors (1007) and subjected to the tone correction (1008). In the tone correction, since the gamma correction is performed as explained above, the optimum tone property can be obtained.

Further, the print data of the bit map image is subjected to the half tone processing (1009) and the pulse width control processing (1010). Then, the print data of the bit map image thus having been subjected to these processings is subjected to the image forming processing for printing out based on the process condition set for the bar code printing (1013).

The invention may be configured by an image control system for performing the aforesaid processings in a manner that the aforesaid operations are executed on the image control system having a communication function or that a computer installs therein a program from a recording medium (CD-ROM, DVD-ROM etc.) storing the program for constituting the aforesaid respective means and executes the program. The computer constituting the image control system is coupled to a CPU (Central Processing Unit), a ROM (Read Only Memory), a RAM Random Access Memory) and a hard disc drive via a system bus. The CPU performs the processings by using the RAM as a work area in accordance with the program stored in the ROM or the hard disc drive.

The medium for providing the program may be a communication medium (a medium for holding the program temporarily or flexibly like a communication line or a communication system). For example, the program may be noticed on an electronic bulletin board (BBS: Bulletin Board Service) of the communication network and distributed via the communication line.

The invention is explained above, and is not limited to the exemplary embodiments shown in the drawings and may be implemented in a manner of being suitably modified within a range not changing the gist thereof. The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image forming apparatus, comprising:

a print data receiving unit that receives print data designating black as a color material for printing a code information portion;

a discriminating unit that discriminates as to whether or not black as a color material is in a usable state;

a print data generation unit that generates, when the discriminating unit discriminates that the color material of black is not the usable state, the print data that changes a designation of the color material of black as to the code information portion of the print data received by the print data receiving portion into a designation of other color material enabling the code information to be read by a code information reading apparatus; and an image forming unit that forms an image by the print data thus changed by the print data generation unit.

2. The image forming apparatus according to claim 1, wherein the print data generation unit generates the print data that changes the designation of the color material of black as to the code information portion into a designation of cyan.

3. The image forming apparatus according to claim 1, wherein the print data generation unit generates the print data that changes the designation of the color material of black as to the code information portion into a designation of a plurality of color material including cyan.

4. The image forming apparatus according to claim 1, wherein the print data generation unit generates the print data that changes the designation of the color material of black as to the code information portion into a designation of a plurality of color material arranged so as to sandwich cyan between other color material.

5. An image forming apparatus, comprising:

a print data receiving unit that receives print data designating black as a color material for printing a code information portion;

a discriminating unit that discriminates as to whether or not the print data received by the print data receiving unit includes a designation of a color material of black except for the code information portion;

a print data generation unit that generates, when the discriminating unit discriminates that the print data includes the designation of the color material of black except for the code information portion, the print data that changes a designation of color material of black as to the code information portion of the print data received by the print data receiving portion into a selective designation of other color material enabling the code information to be read by a code information reading apparatus; and an image forming unit that forms an image by the print data changed by the print data generation unit.

6. The image forming apparatus according to claim 5, wherein the print data generation unit generates the print data that selectively changes the designation of the color material of black as to the code information portion into a designation of cyan.

7. The image forming apparatus according to claim 5, wherein the print data generation unit generates the print data that selectively changes the designation of the color material of black as to the code information portion into a designation of a plurality of color material including cyan.

8. The image forming apparatus according to claim 5, wherein the print data generation unit generates the print data that selectively changes the designation of the color material of black as to the code information portion into a designation of a plurality of color material arranged so as to sandwich cyan between other color material.

9. A non-transitory computer readable medium storing a program causing a computer to execute a process for controlling an image form, the process comprising:

receiving print data designating black as a color material for printing a code information portion;

discriminating as to whether or not black as a color material is in a usable state;

generating, when the discriminating unit discriminates that the color material of black is not the usable state, the print data that changes a designation of the color material of black as to the code information portion of the print data received by the print data receiving portion into a designation of other color material enabling the code information to be read by a code information reading apparatus; and forming an image by the print data thus changed by the print data generation unit.

10. A non-transitory computer readable medium storing a program causing a computer to execute a process for controlling an image form, the process comprising:

receiving print data designating black as a color material for printing a code information portion;

discriminating as to whether or not the print data received by the print data receiving unit includes a designation of a color material of black except for the code information portion;

generating, when the discriminating unit discriminates that the print data includes the designation of the color material of black except for the code information portion, the print data that changes a designation of color material of black as to the code information portion of the print data received by the print data receiving portion into a selective designation of other color material enabling the code information to be read by a code information reading apparatus; and forming an image by the print data changed by the print data generation unit.

* * * * *